United States Patent
Yagami

(10) Patent No.: US 9,976,910 B2
(45) Date of Patent: May 22, 2018

(54) INFRARED DETECTOR AND DETECTION METHOD THEREOF, AND ELECTRONIC APPARATUS

(71) Applicant: Sony Corporation, Tokyo (JP)

(72) Inventor: Kojiro Yagami, Kanagawa (JP)

(73) Assignee: Sony Corporation, Tokyo (JP)

( * ) Notice: Subject to any disclaimer, the term of this patent is extended or adjusted under 35 U.S.C. 154(b) by 828 days.

(21) Appl. No.: 14/551,920

(22) Filed: Nov. 24, 2014

(65) Prior Publication Data

US 2015/0153236 A1 Jun. 4, 2015

(30) Foreign Application Priority Data

Dec. 4, 2013 (JP) ................. 2013-251165

(51) Int. Cl.
| | |
|---|---|
| *G01J 5/08* | (2006.01) |
| *H04N 5/33* | (2006.01) |
| *H04N 5/232* | (2006.01) |
| *G01J 1/42* | (2006.01) |
| *G01J 3/36* | (2006.01) |
| *G01J 5/20* | (2006.01) |
| *G01J 5/00* | (2006.01) |

(52) U.S. Cl.
CPC ............. *G01J 5/0853* (2013.01); *G01J 1/42* (2013.01); *G01J 3/36* (2013.01); *G01J 5/0846* (2013.01); *G01J 5/20* (2013.01); *H04N 5/23241* (2013.01); *H04N 5/33* (2013.01); *G01J 2005/0077* (2013.01)

(58) Field of Classification Search
CPC .......... G01J 5/0853; G01J 5/20; G01J 5/0846; G01J 1/42

USPC ....................................... 250/338.1
See application file for complete search history.

(56) References Cited

U.S. PATENT DOCUMENTS

| | | | | |
|---|---|---|---|---|
| 5,240,762 A | * | 8/1993 | Miura | ............... B82Y 20/00 359/240 |
| 2012/0092536 A1 | * | 4/2012 | Hirota | ............... H01L 27/14645 348/294 |

FOREIGN PATENT DOCUMENTS

| | | |
|---|---|---|
| JP | 05-273503 A | 10/1993 |
| JP | 2009-042164 A | 2/2009 |

OTHER PUBLICATIONS

Okamoto et al., "All-optical spatial light modulator with surface plasmon resonance", Optics Letters, vol. 18, No. 18, Optical Society of America, Sep. 15, 1993, 3 pages.
Terasaki et al., "Bio-photosensor: Cyanobacterial photosystem I coupled with transistor via molecular wire", Biochimica et Biophysica Acta 1767 (2007) 653-659, Elsevier B.V., Sep. 30, 2006, 7 pages.

\* cited by examiner

*Primary Examiner* — David Porta
*Assistant Examiner* — Meenakshi Sahu
(74) *Attorney, Agent, or Firm* — Sheridan Ross P.C.

(57) ABSTRACT

An infrared detector includes a source region and a drain region which are formed on a semiconductor substrate, an infrared ray absorbing film as a gate insulating film formed on the semiconductor substrate, and a gate electrode which is formed of a transparent electrode for infrared rays on the gate insulating film, in which, when a predetermined voltage is applied to the gate electrode, a predetermined current flows between the source region and the drain region.

17 Claims, 6 Drawing Sheets

INFRARED DETECTOR AND DETECTION METHOD THEREOF, AND ELECTRONIC APPARATUS

CROSS REFERENCE TO RELATED APPLICATIONS

This application claims the benefit of Japanese Priority Patent Application JP 2013-251165 filed Dec. 4, 2013, the entire contents of which are incorporated herein by reference.

TECHNICAL FIELD

The present disclosure relates to an infrared detector and a detection method thereof, and an electronic apparatus, and more particularly to an infrared detector which can detect infrared rays with a simpler configuration and a detection method thereof, and an electronic apparatus.

BACKGROUND ART

As a far-infrared detector, a bolometer is generally used. The bolometer has an element for detecting a resistance change caused by heat; as such the bolometer is highly sensitive. However, since cooling by Peltier elements is necessary to maintain a constant temperature of the element, the bolometer consumes large amounts of power and becomes heavy when in a large form as a sensor. In addition, an S/N (temperature resolution) of a thermal image signal is likely to be affected by background radiation, and periodic calibration of each pixel with respect to temperature is necessary for the measurement. Therefore, a large-capacity memory is necessary, and in some instances, the acquisition of an image may be interrupted for calibration. With the special structure of a MEMS shape, the bolometer is not mass produced like a solid-state device. As a result, the bolometer has high power consumption, is expensive, large, and heavy. Therefore, there is a phenomenon wherefar-infrared ray detection does not occur and a realm for special use bolometers does not exist.

When using the principle of photoelectric conversion which is commonly used for visible ray detection for far-infrared rays detection, it is possible to use a solid element formed of a semiconductor or the like. However, since the energy of the far infrared rays (wavelength about 10 micrometer) is as small as 120 meV, it is necessary to cool the solid element to the temperature of liquid nitrogen or below.

As an imager for photosynthesis use using a field-effect transistor (FET), the imager performs imaging by being connected to a photosynthesis center using the molecular wire on a gate electrode, and modulating a gate potential using photoexcitation potential of photosynthesis in light reception (for example, refers to NPL 1).

However, since a detection wavelength is limited to a wavelength at which bio-molecules can photosynthesize in the imager, the detection wavelength is limited to a single wavelength of visible rays and far-infrared rays may not be detected. In addition, this imager includes a solution system and uses bio-materials, thereby having low durability. Photoexcitation potential is small, sensitivity is low, and an S/N ratio is also small.

Several far-infrared ray sensors of the spatial light modulation type have also been proposed (for example, refer to NPL 2, PTL 1 and 2). The spatial light modulation type is a method for obtaining a thermal image by detecting a temperature change of dielectrics due to absorption of far-infrared rays through changes in the dielectric constant.

CITATION LIST

Patent Literature

PTL 1
Japanese Unexamined Patent Application Publication No. 5-273503
PTL 2
Japanese Unexamined Patent Application Publication No. 2009-042164

Non Patent Literature

NPL 1
"Bio-photosensor: Cyanobacterial photosystem I coupled with transistor via molecular wire", Biochimica et Biophysica Acta Volume 1767 (2007), p. 653-659
NPL 2
T. Okamoto, et al., Optics letters 18, p.1570 (1993)

SUMMARY

Technical Problem

However, since a far-infrared ray sensor of a spatial light modulation type optically detects a temperature change of all dielectrics, an optical mechanism is necessary. Therefore, the structure of such far-infrared ray sensor becomes complicated and the number of parts becomes numerous.

It is desirable to detect infrared rays using a simpler configuration.

Solution to Problem

According to a first embodiment of the present disclosure, there is provided an infrared detector, including a source region and a drain region which are formed on a semiconductor substrate, an infrared rays absorbing film as a gate insulating film formed on the semiconductor substrate, and a gate electrode which is formed of a transparent electrode for infrared rays on the gate insulating film, in which, when a predetermined voltage is applied to the gate electrode, a predetermined current is configured to flow between the source region and the drain region.

According to a second embodiment of the present disclosure, there is provided a method of detecting infrared rays, including detecting, with an infrared detector, a change in a dielectric constant caused by a temperature rise due to absorption of infrared rays by the infrared ray absorbing film as a gate capacity change, in which the infrared detector includes a source region and a drain region formed on a semiconductor substrate, an infrared ray absorbing film as a gate insulating film formed on the semiconductor substrate, and a gate electrode formed of a transparent electrode with respect to infrared rays on the gate insulating film.

According to a third embodiment of the present disclosure, there is provided an electronic apparatus, including an infrared detector which includes a source region and a drain region formed on a semiconductor substrate, an infrared ray absorbing film as a gate insulating film formed on the semiconductor substrate, and a gate electrode formed of a transparent electrode with respect to infrared rays on the gate insulating film, in which a predetermined current flows between the source region and the drain region when a predetermined voltage is applied to the gate electrode.

In the first and third embodiment of the present disclosure, a source region and a drain region formed on a semiconductor substrate, an infrared ray absorbing film as a gate insulating film formed on the semiconductor substrate, and a gate electrode formed of a transparent electrode with respect to infrared rays on the gate insulating film may be provided, and a predetermined current may flow between the source region and the drain region when a predetermined voltage is applied to the gate electrode.

In the second embodiment of the present disclosure, an infrared detector, which includes a source region and a drain region formed on a semiconductor substrate, an infrared ray absorbing film as a gate insulating film formed on the semiconductor substrate, and a gate electrode formed of a transparent electrode with respect to infrared rays on the gate insulating film, may detect a change in a dielectric constant caused by a temperature rise due to an absorption of infrared rays by the infrared rays absorbing film as a gate capacity change.

The infrared detector and the electronic apparatus may be an independent device, and also may be a module embedded in other devices.

Advantageous Effects of Invention

According to the first to the third embodiments of the present disclosure, it is possible to detect infrared rays using a simpler configuration.

Effects described herein are not necessarily limited, and may include any effect described in this disclosure.

DESCRIPTION OF EMBODIMENTS

Configuration of Thermal Imaging Sensor

Figure 1:
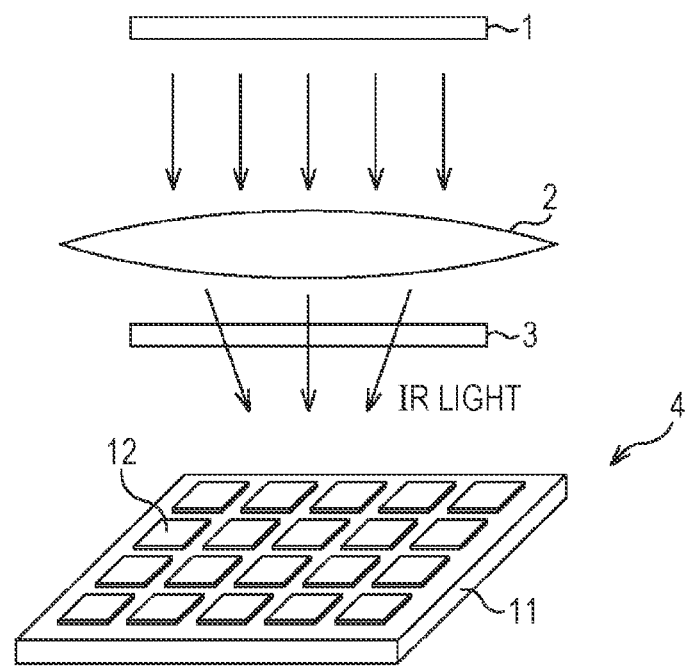
FIG. 1 is a diagram which shows a heat ray detection mechanism including an infrared detector according to the present disclosure.

FIG. 1 is a diagram which shows a heat ray detection mechanism including an infrared detector according to the present disclosure.

The heat ray detection mechanism shown in FIG. 1 is configured to have a shutter 1, an IR lens 2, a cut filter 3, and a thermal imaging sensor 4.

The shutter 1 controls (shield/pass) the incidence of light on the IR lens 2 through an opening or closing operation. The IR lens 2 is a condensing lens formed of a material allowing at least infrared rays to be transmitted, and condenses light (incident light) incident when the shutter 1 is open, to the thermal imaging sensor 4. The cut filter 3 allows only far-infrared rays (FIR) to be transmitted by cutting visible rays and near-infrared rays among incident light.

The thermal imaging sensor 4 is configured by arranging infrared detectors 12 as a pixel in a two-dimensional array shape on the semiconductor substrate 11 in which, for example, silicon (Si) is used as a semiconductor. The far-infrared rays passing through the shutter 1, the IR lens 2, and the cut filter 3 are incident on respective infrared detectors 12 arranged in a two-dimensional array shape.

Configuration of Infrared Detector

Figure 2:
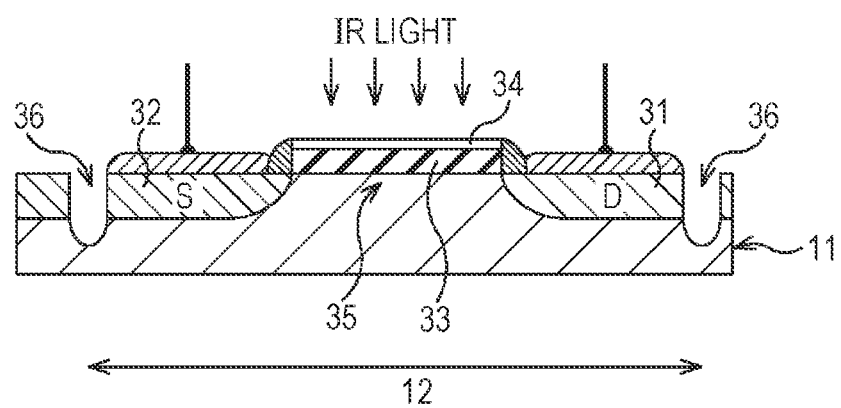
FIG. 2 is a diagram which shows a configuration example of the infrared detector.

FIG. 2 shows a configuration example of an infrared detector 12.

In the infrared detector 12, for example, a drain region 31 and a source region 32 are semiconductor regions of an n-type (second conductivity type) formed by ion-implanting impurities of a high concentration on a semiconductor substrate 11 of a p-type (first conductivity type). In addition, a gate electrode 34 is formed on the semiconductor substrate 11 through a gate insulating film 33. The infrared detector 12 is configured so that, when a predetermined voltage is applied to the gate electrode 34, a predetermined current flows between the drain region 31 and the source region 32 through a channel 35.

Thus, the infrared detector 12 which configures one pixel of the thermal imaging sensor 4 has the same structure as a metal-oxide-semiconductor-field-effect transistor (MOSFET). However, materials of the gate insulating film 33 and the gate electrode 34 are different from a general MOSFET.

Specifically, an IR absorbing film which is a material for absorbing far-infrared rays is formed as the gate insulating film 33. As a material of the IR absorbing film, it is possible to use various types of materials which have a large change in temperature of a dielectric constant such as Acrylic resin (PMMA), a silicon nitride film, a karukobaraito system, a liquid crystal molecule film, a photo chromic material, glass, a dye organic film (dye gain medium), a thin film obtained by dispersing quantum dots (Si and the like), a material used as an IR cut filter, a heat ray shielding material, and the like.

Since there is a concern that a noise source is created by the interface level formation and the like at an interface between the channel 35 and the gate insulating film 33, when considering suppressing the interface level formation by reducing the damage to the channel 35 interface due to formation of the gate insulating film 33, organic materials are desirable for the gate insulating film 33. The thickness of the gate insulating film 33 can be appropriately set according to an absorption coefficient with respect to far-infrared rays. There is no particular limit on the thickness. However, if the film is too thick, it takes time to reset the temperature through a temperature increase due to the absorption of infrared rays and radiation of heat, therefore, the thickness is desirably several micrometer or less. As the absorption coefficient of far-infrared rays is large, and a temperature coefficient in non-linear temperature dependence of a dielectric constant is large, detection with high sensitivity becomes possible.

On the other hand, as a material of the gate electrode 34, a conductive transparent material which transmits far-infrared rays such as graphene and the like has been used. Graphene has a transmittance of about 97% to 98% regardless of the wavelength of light, and is suitable as a material of the gate electrode 34. In addition, as a material of the gate electrode 34, ZnO-based material doped with impurities, ITO (indium tin oxide), and the like may be used.

Grooves 36 for preventing heat from being diffused to an adjacent pixel are formed at a boundary between an infrared detector 12 and other adjacent infrared detectors 12. The grooves 36 may be filled with a predetermined material so as to prevent chipping, and the like.

Since the channel 35 is a region that is about several nm apart from a substrate surface, pixels do not have to be physically (spatially) separated and it is sufficient to prevent heat conduction on the substrate surface using the grooves 36. Therefore, since multiple infrared detectors 12 can be formed on one semiconductor substrate 11 by a semiconductor process, manufacturing is facilitated, and it is possible to mass-produce a far-infrared ray detector at a low price.

An insulation layer such as $SiO_2$ and the like may be formed between the semiconductor substrate 11 and the gate insulating film 33.

Figure 3:
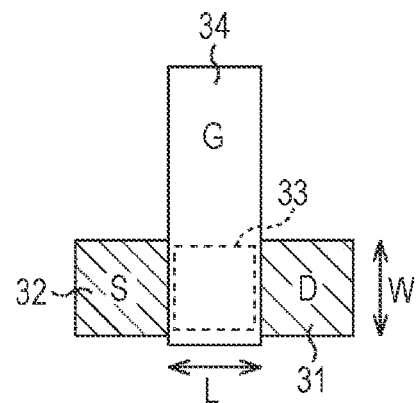
FIG. 3 is a top view of the infrared detector.

FIG. 3 is a top view of the infrared detector 12 which shows a disposition relationship among a drain region 31, a source region 32, a gate insulating film 33, and a gate electrode 34.

For example, a size of one pixel is set according to a magnitude of wavelengths of infrared rays to be detected. Specifically, since a wavelength of far-infrared rays is about 10 micrometer, a channel width W and a channel length L shown in FIG. 3 are set to be about 10 micrometer. However, the embodiment is not limited thereto. The size of one pixel may be larger or smaller than the wavelength of infrared rays to be detected. In addition, a plurality of pixels of smaller size than the wavelength of infrared rays to be detected may be arranged, and processed as one pixel. That is, pixel size can be appropriately determined according to the application thereof.

Figure 4:
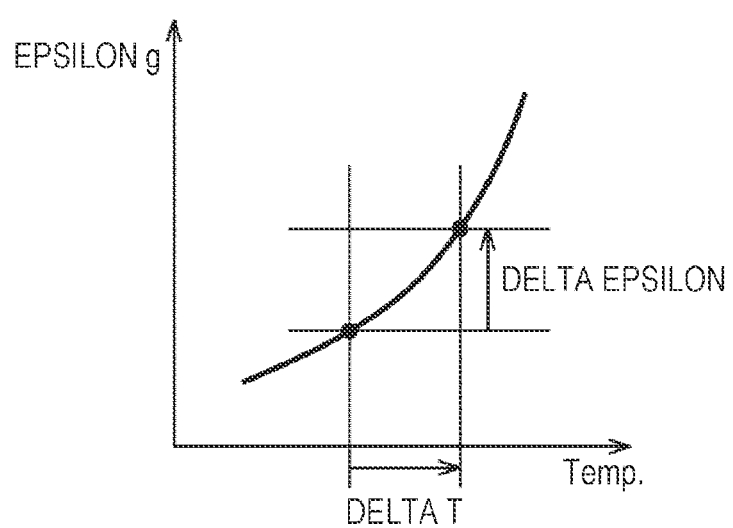
FIG. 4 is a graph which shows temperature dependence of an IR absorbing film.

FIG. 4 shows temperature dependence of an IR absorbing film as the gate insulating film 33. However, FIG. 4 is an example in which a temperature coefficient of the dielectric constant of the IR absorbing film is a positive value.

Incident far-infrared rays are absorbed in the gate insulating film 33 by passing through the gate electrode 34, but at this time, the temperature of the gate insulating film 33 is increased. Then, when the temperature coefficient of the dielectric constant of the IR absorbing film is a positive value, a dielectric constant $epsilon_g$ of the gate insulating film 33 is increased due to the temperature increase. In the example of FIG. 4, when the temperature is increased by delta T, the dielectric constant $epsilon_g$ is increased by $delta_{epsilon}$. The infrared detector 12 detects a dielectric constant change of the gate insulating film 33 when absorbing far-infrared rays by a drain current change as a gate capacity change.

A drain current $I_D$ of FET is represented by $I_D$=micro (W/L)$C_g$ ($V_G$-$V_{th}$) $V_D$ in a linear region for a drain voltage $V_D$. Here, micro is a mobility of a carrier, W is a channel width, L is a channel length, $C_g$ is a gate capacity, $V_G$ is a gate voltage, $V_{th}$ is a threshold voltage, and $V_D$ is a drain voltage.

The gate capacity $C_g$ of MOS is simply represented by $C_g$=$epsilon_g$S/d. Here, $epsilon_g$ is a dielectric constant of the gate insulating film 33, S is an area of the channel 35 which is opposed to the gate electrode 34, and d is a thickness of the gate insulating film 33.

Accordingly, a variation delta $epsilon_g$ in the dielectric constant $epsilon_g$ due to a temperature change is a change in the gate capacity $C_g$. A variation delta $C_g$ in the gate capacity $C_g$ is detected as a variation delta $I_D$ in the drain current $I_D$.

Accordingly, a temperature change delta T of the gate insulating film 33 when absorbing far-infrared rays can be detected as a variation delta $I_D$ in the drain current $I_D$. For example, when a temperature coefficient of the dielectric constant $epsilon_g$ is set to be 0.1%/deg C, and $I_D$ is 1 mA, delta T is 10 mK and delta $I_D$ is 1 micro A, and thereby practical use can be fully possible.

Figure 5:
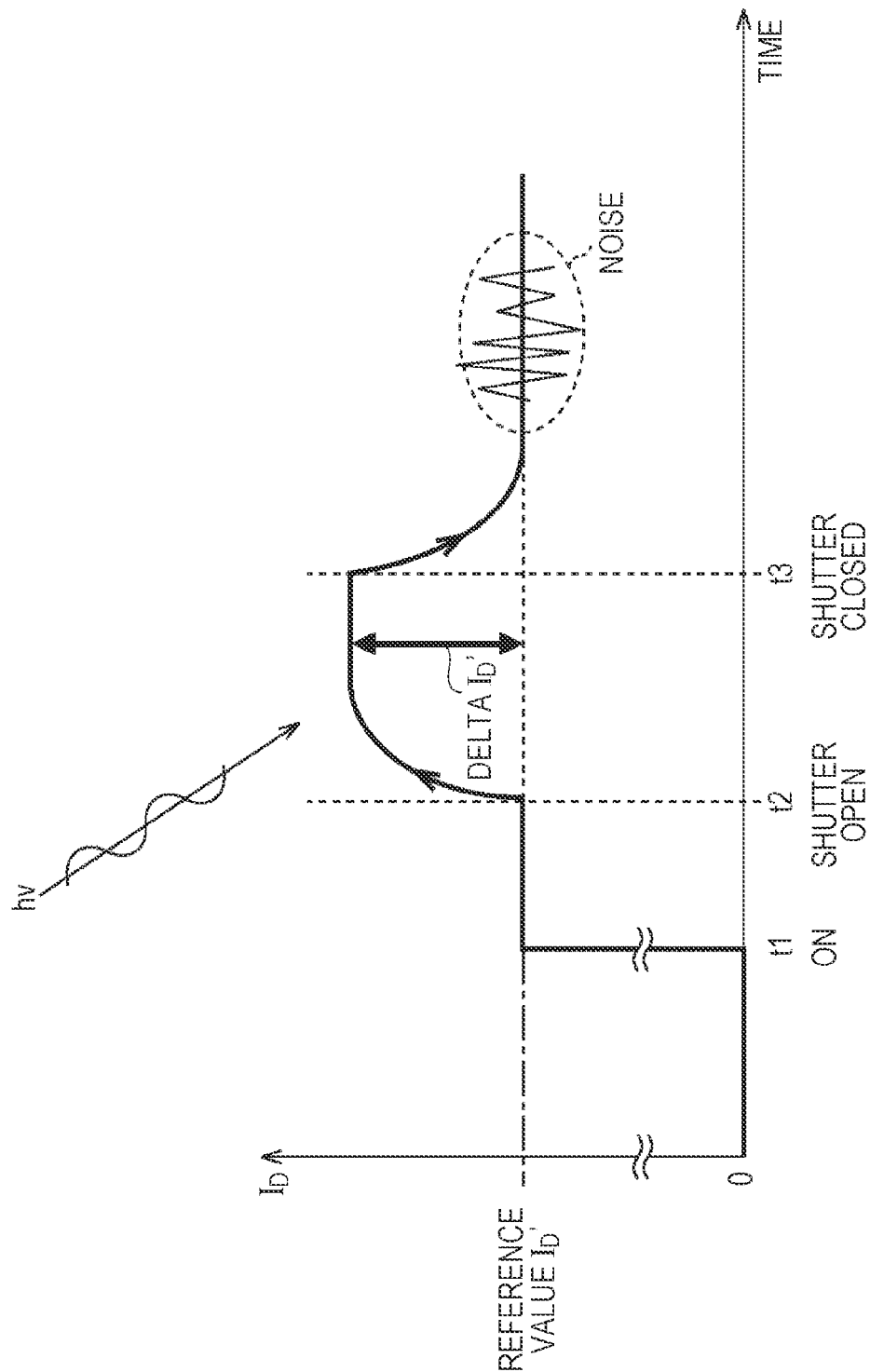
FIG. 5 is a graph which describes a detection operation of the infrared detector.

Referring to FIG. 5, a detection operation in the infrared detector 12 will be described.

First, at time t1, a gate voltage $V_G$ and a drain voltage $V_D$ are applied, and the infrared detector 12 is turned on. Accordingly, a constant drain current $I_D$ flows in the infrared detector 12, and temperature of the infrared detector 12 becomes stable. At the time, temperature of the channel 35 becomes the same as temperature of the gate insulating film (IR absorbing film) 33. A drain current $I_D$' when the temperatures become stable is a reference value.

Then, at time t2, the shutter 1 is opened, and thereby far-infrared rays start to be received (thermal image photographing).

In the gate insulating film 33, drain current $I_D$ is increased along with a temperature increase due to absorption of far-infrared rays, and reaches a thermal equilibrium state by an increase in a variation delta $I_D$ from the reference value $I_D$' to become stable.

Then, at time t3, when the shutter 1 is closed, heat of the gate insulating film 33 is rapidly radiated through the semiconductor substrate 11 side or the gate electrode 34, and the drain current returns to an original reference value $I_D$'. Accordingly, it is possible to prevent a residual image after an imaging.

In general, background noise (white noise) overlaps the drain current $I_D$; however, this can be offset by time integration, and a signal component only can be taken out as an amount of charge.

If time when the shutter 1 is open is, for example, 1 msec, an amount of signal charges (the number of electrons) obtained when the variation delta $I_D$ of the drain current $I_D$ is 1 micro A (delta $I_D$=1 micro A) is ideally 1 delta A*1 ms/e$^-$=6.3E9. Considering a decrease in variation delta $I_D$ in the drain current $I_D$, noise correction and the like due to rise time or a release of heat, it is possible to obtain a sufficient number of electrons when performing detection.

That is, the infrared detector 12 can detect a temperature change of 10 mK in an element thereof (corresponds to temperature resolution), and temperature detection capability exceeding that of a bolometer can be obtained.

Moreover, according to the far-infrared ray detection principle described above, in order to detect a relative change of the drain current $I_D$, a baseline change is not a problem, and it is not necessary to constantly maintain an element temperature as a basic usage. Accordingly, it is not necessary to cool down the infrared detector 12, so that a cooling mechanism such as a Peltier element and the like is not necessary. In addition, there is robustness (resistance) with respect to background radiation or outside temperature changes.

An S/N ratio can be improved when the infrared detector 12 is cooled down. Thus, when intending to perform a more sensitive measurement, a cooling mechanism such as a Peltier element and the like may be naturally provided. For example, the Peltier element can be attached to a lower surface of the semiconductor substrate 11.

A portion of the far-infrared rays incident on the gate insulating film 33 is not absorbed by the gate insulating film 33, but may penetrate into the channel 35 of the semiconductor substrate 11. However, since the channel 35 is not heated or photoelectric conversion does not occur so as for far-infrared rays to transmit silicon, it is possible to ignore influence on detection.

Response speed (operation frequency) depends on a rising time of temperature of the gate insulating film 33, a fall time for radiation, and a signal integration time for noise cancellation. However, in the present device, about 1 msec in total is expected to be enough, so that imaging of at least 1,000 fps (frame per sec) can be expected.

Figure 6:
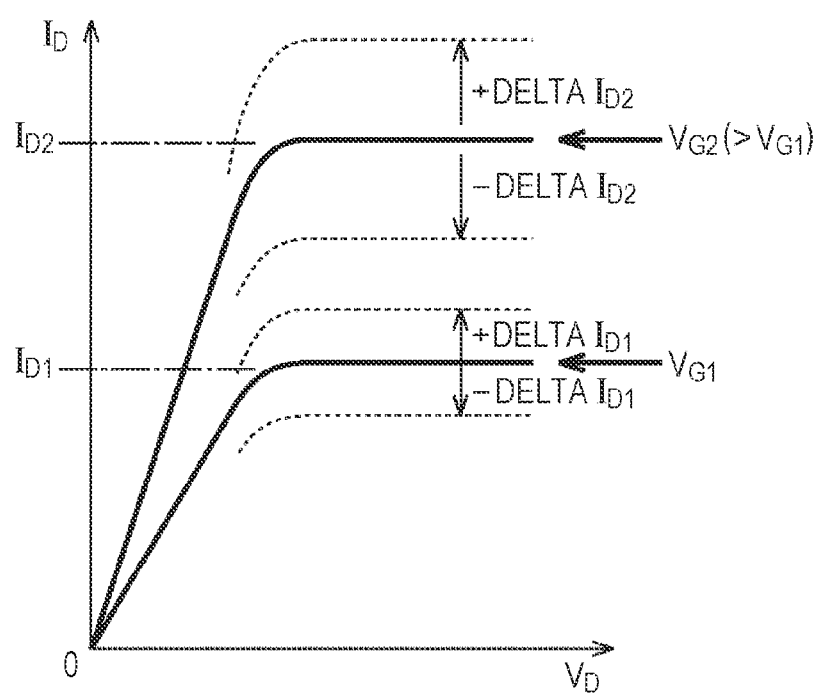
FIG. 6 is a graph which shows a relationship between a drain current $I_D$ and a drain voltage $V_D$ of the infrared detector.

FIG. 6 shows a relationship between a drain current $I_D$ and a drain voltage $V_D$ of the infrared detector 12.

As shown in FIG. 6, when a gate voltage $V_G$ has a relationship of $V_{G2} > V_{G1}$, a drain current $I_D$ at saturation becomes $I_{D2} > I_{D1}$. That is, a magnitude of the drain current $I_D$ at saturation depends on a magnitude of a gate voltage $V_G$.

In addition, when the gate voltage $V_G$ has a relationship of $V_{G2} > V_{G1}$, a variation delta $I_D$ of the drain current $I_D$ at saturation is |delta $I_{D2}$|>|delta $I_{D1}$|. That is, an absolute value of the variation delta $I_D$ of the drain current $I_D$ at saturation depends on a magnitude of the gate voltage $V_G$. When the dielectric constant $epsilon_g$ of IR absorbing film is a positive temperature coefficient, a variation of the drain current $I_D$ is positive (+delta $I_D$), and when the dielectric constant of IR absorbing film is a negative temperature coefficient, the variation of the drain current $I_D$ is negative (−delta $I_D$).

Thus, since the absolute value of variation delta $I_D$ of the drain current $I_D$ can be amplified by a set value of the drain current $I_D$, that is, a gate voltage $V_G$, there is an advantage that it is not necessary to provide an additional amplifier circuit.

It is possible that channel temperature is increased by heat conduction from the gate insulating film 33.

Figure 7:
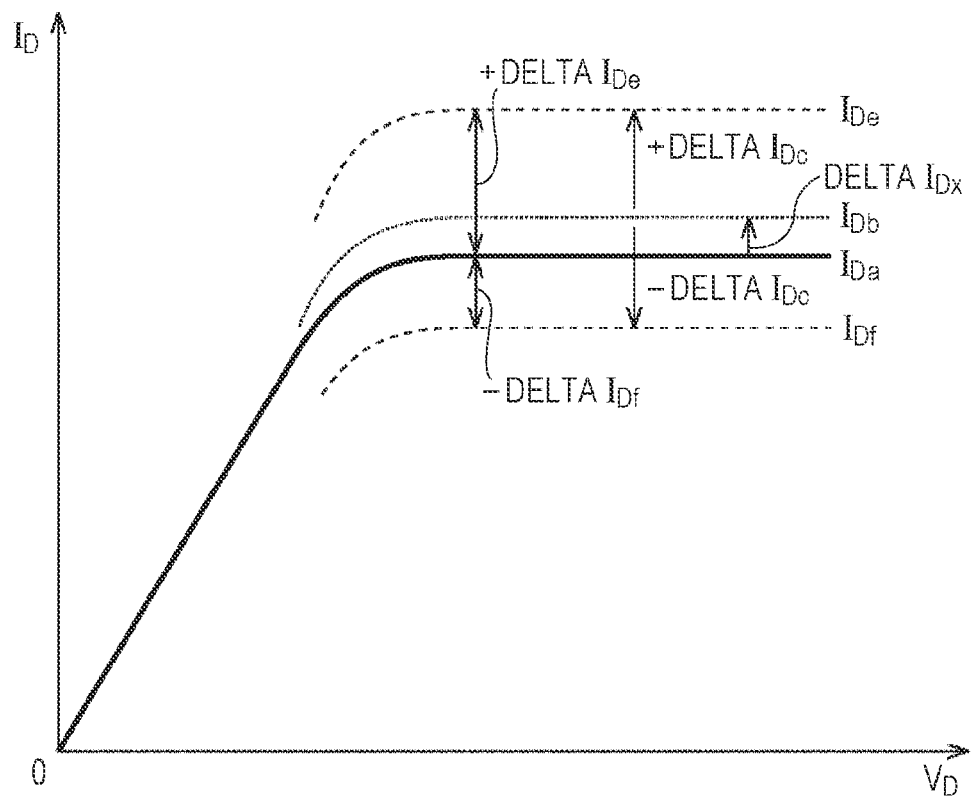
FIG. 7 is a graph which shows a relationship between a drain current $I_D$ and a drain voltage $V_D$ considering a rise in channel temperature.

FIG. 7 shows a relationship between a drain current $I_D$ and a drain voltage $V_D$ considering a rise in channel temperature.

For example, as shown in FIG. 7, in a state where a constant drain current $I_{Da}$ flows in the infrared detector 12 and temperature of the infrared detector 12 is stable, the drain current $I_D$ is increased from the drain current $I_{Da}$ by delta $I_{Dx}$ and is changed to a drain current $I_{Db}$ due to an increase in channel temperature.

When the drain current $I_{Db}$ is stable, the shutter 1 is opened and receiving far-infrared rays is started. In the gate insulating film 33, the drain current $I_D$ is regarded to be changed along with a temperature rise by the absorption of far-infrared rays.

At this time, when the dielectric constant $epsilon_g$ of IR absorbing film as the gate insulating film 33 is a positive temperature coefficient, the drain current $I_D$ is increased by a variation delta $I_{Dc}$ from the drain current $I_{Db}$ to become a drain current $I_{De}$.

On the other hand, when the dielectric constant $epsilon_g$ of IR absorbing film as the gate insulating film 33 is a negative temperature coefficient (when the absolute values are the same and only signs are different), the drain current $I_D$ is decreased by the variation delta $I_{Dc}$ from the drain current $I_{Db}$ to become a drain current $I_{Df}$.

However, in fact, a variation of the drain current $I_D$ appearing as an output of the infrared detector 12 is a variation +delta $I_{De}$ from the drain current $I_{Da}$ to the drain current $I_{De}$ in the case of a positive temperature coefficient, and is a variation −delta $I_{Df}$ from the drain current $I_{Da}$ to the drain current $I_{Df}$ in the case of a negative temperature coefficient.

With regard to magnitudes (absolute values) of the variations +delta $I_{De}$ and −delta $I_{Df}$, as apparent from FIG. 7, the variation +delta $I_{De}$ is larger (|delta $I_{De}$|>|delta $I_{Df}$|).

Therefore, when selecting a material in which the dielectric constant $epsilon_g$ of IR absorbing film as the gate insulating film 33 has a positive temperature coefficient, an increase delta $I_{Dx}$ due to a channel temperature rise is added to a variation +delta $I_{Dc}$ by a gate capacity increase due to absorption of far-infrared rays, and a variation +delta $I_{De}$ as an output of the infrared detector 12 is larger than the variation +delta $I_{Dc}$ due to absorption of far-infrared rays.

When selecting a material in which the dielectric constant $epsilon_g$ of IR absorbing film as the gate insulating film 33 has a negative temperature coefficient, a variation −delta $I_{Dc}$ by a gate capacity increase due to absorption of far-infrared rays is offset by an increase delta $I_{Dx}$ due to a channel temperature rise, a variation −delta $I_{Df}$ as an output of the infrared detector 12 is smaller than the variation −delta $I_{Dc}$ due to absorption of far-infrared rays.

Accordingly, an IR absorbing film as the gate insulating film 33 may be made of any material in which the dielectric constant $epsilon_g$ has a positive temperature coefficient or a negative temperature coefficient. However, it is preferable to use a material in which the dielectric constant $epsilon_g$ has a positive temperature coefficient since an increase delta $I_{Dx}$ of the drain current $I_D$ due to a channel temperature rise can be used for an increase of detection sensitivity.

[Detection Method of Absolute Temperature]

The infrared detector 12 described above detects a relative change delta T' in the temperature of a measuring object based on a relative change in the drain current $I_D$ due to absorption of far-infrared rays by the gate insulating film 33, that is, a variation delta $I_D$' from the reference value $I_D$'. However, an absolute value of the temperature of the measuring object can be also detected.

Specifically, from data regarding temperature dependence of the dielectric constant $epsilon_g$ of an IR absorbing film as the gate insulating film 33 shown in FIG. 4, and from a relative change delta $I_D$' of the drain current $I_D$, a temperature change delta T' is back-calculated (delta $I_D$'→delta $C_g$'→delta $epsilon_g$→delta T'). At this time, a condition of element driving parameters such as a gate voltage $V_G$, a drain voltage $V_D$, and the like is made to be constant. The temperature change delta T' corresponding to the detected relative change delta $I_D$' is stored as a table in advance, and it is possible to immediately detect a temperature change delta T' using the table.

In addition, a reference temperature $T_0$ of the infrared detector 12 in the reference value $I_D$' is measured using a temperature measuring element such as a thermocouple or a temperature measuring mechanism. Then, it is possible to calculate an absolute value ($T_0$+delta T') of the temperature of a measuring object based on the measured reference temperature $T_0$ and the temperature change delta T'. By setting the reference temperature $T_0$ of the infrared detector 12 to be a desired temperature by a temperature control device such as a Peltier element, the temperature change delta T' may be detected from the desired temperature.

Modification Example

Figure 8:
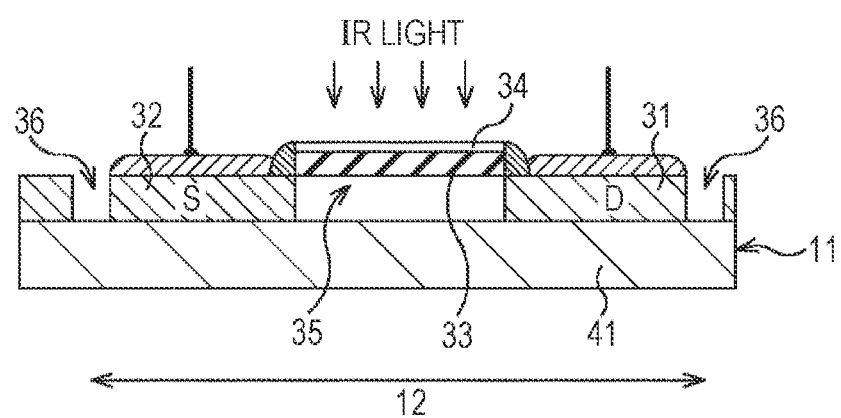
FIG. 8 is a diagram which shows a configuration example of an infrared detector using an SOI substrate.

An example described above is an example in which the semiconductor substrate 11 is a bulk substrate as shown in FIG. 2; however, as shown in FIG. 8, an SOI substrate which has a BOX layer (embedded oxide film) 41 may also be used.

Moreover, the IR absorbing film may be regarded as the gate insulating film 33 and a transparent conductive material which transmits far-infrared rays may be regarded as the gate electrode 34 based on a FET structure in which a material (inorganic, organic) other than silicon is used. Furthermore, the IR absorbing film can be regarded as the gate insulating film 33, and the transparent conductive material which transmits far-infrared rays may be regarded as the gate electrode 34 based on a Schottky type FET structure in which the drain region 31 and the source region 32 are regarded as a metal layer.

Figure 9:
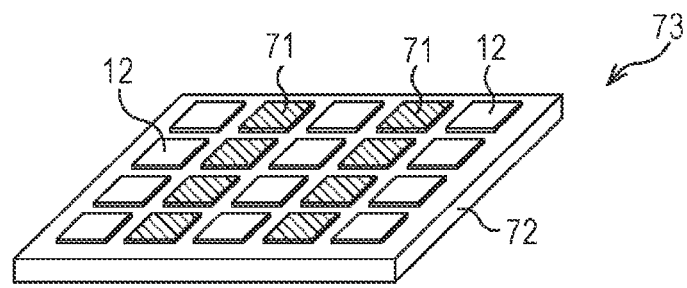
FIG. 9 is a diagram which shows an example of the other imaging sensors.

In the example described above, as shown in FIG. 1, the thermal imaging sensor 4 in which a plurality of infrared detectors 12 are configured to be arranged in a two-dimensional array shape will be described. However, since the infrared detector 12 has a MOSFET structure, the infrared detector 12 can be formed as a portion of an image sensor which detects general visible rays. For example, as shown in FIG. 9, an imaging sensor 73 in which a pixel row of the infrared detectors 12 and a pixel row of visible ray detector 71 are alternately formed on the semiconductor substrate 72 can be prepared.

In the example described above, a saturation region of $I_D$-$V_D$ characteristics of the infrared detector 12 is made to be used to detect a variation delta $I_D$ of the drain current $I_D$ as an output of the infrared detector 12, but a linear region may be also used.

A cut filter 3 which cuts visible rays and near-infrared rays, as shown in FIG. 1, is provided separately from the thermal imaging sensor 4 so as to cover an entire surface of the thermal imaging sensor 4. However, as a portion of the thermal imaging sensor 4, a filter layer which cuts visible rays and near-infrared rays is disposed only in a far-infrared ray detection region of each pixel, and the other region in a pixel may have a light-shielding structure.

The bolometer has to be vacuum-seal packaged in order to reduce disturbances due to heat, but the infrared detector 12 may not be vacuum-seal packaged. Of course, the infrared detector may be vacuum-seal packaged.

Since the infrared detector 12 does not optically detect temperature change in the dielectric constant $epsilon_g$ of an IR absorbing film as the gate insulating film 33, but directly and electrically detects the temperature change, an optical mechanism is not necessary. The infrared detector 12 does not require a Peltier element for cooling, so the infrared detector is small, light, power-saving, and inexpensive. In addition, since the detector is not affected by the background radiation, it is possible to improve the S/N ratio thereof. Periodic calibration of each pixel with respect to the temperature is not necessary for the measurement, so that a large capacity memory is unnecessary and an image is not interrupted during an image acquisition processes for calibration.

(Application Example to Electronic Apparatus)

The infrared detector 12 described above can be applied to various electronic apparatuses such as a night vision apparatus, a surveillance camera, a thermo viewer, an automotive night camera (pedestrian monitor), a human sensor, and the like.

Figure 10:
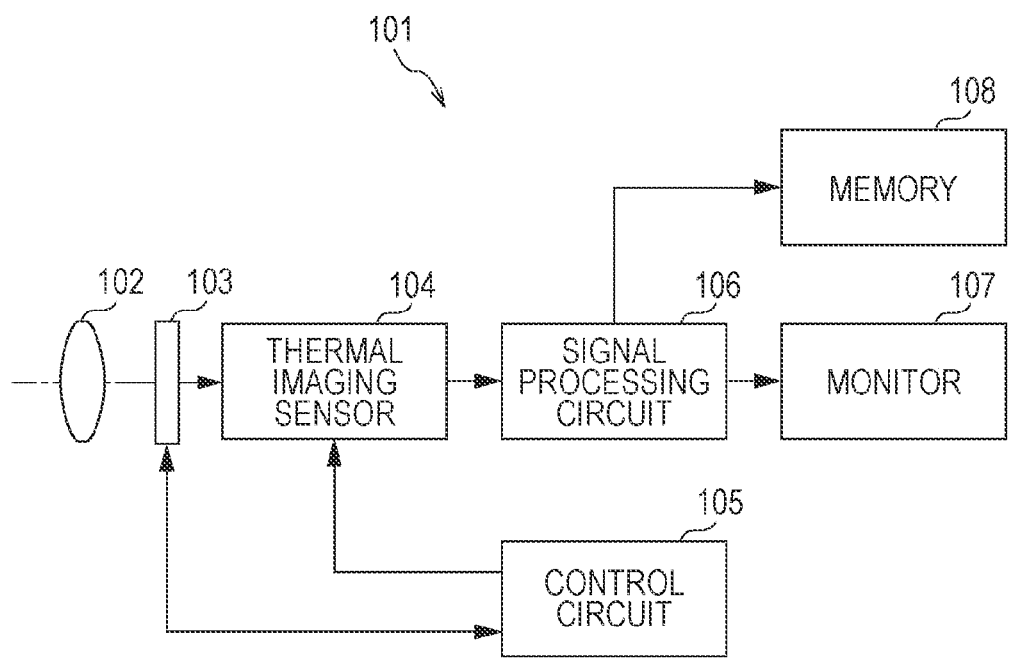
FIG. 10 is a block diagram which shows a configuration example of a thermal imaging apparatus as an electronic apparatus according to the present disclosure.

FIG. 10 is a block diagram which shows a configuration example of a thermal imaging apparatus as an electronic apparatus according to the present disclosure.

A thermal imaging apparatus 101 shown in FIG. 10 is configured to have an optical system 102, a shutter device 103, a thermal imaging sensor 104, a control circuit 105, a signal processing circuit 106, a monitor 107, and a memory 108.

The optical system 102 includes at least the IR lens 2 and the cut filter 3 described above. The optical system. 102 can adopt a configuration the same as that used in the bolometer and the like. The optical system 102 leads far-infrared rays (incident light) from a subject to the thermal imaging sensor 104, and allows the far-infrared rays to be image-formed on a light-receiving surface of the thermal imaging sensor 104.

The shutter device 103 is disposed between the optical system 102 and the thermal imaging sensor 104, and controls a light irradiation period to the thermal imaging sensor 104 and a light-shielding period according to a control of the control circuit 105.

The thermal imaging sensor 104 is configured to include the thermal imaging sensor 4 described above. The thermal imaging sensor 104 accumulates signal charges for a given period according to the far-infrared rays image-formed on the light-receiving surface through the optical system. 102 and the shutter device 103. The signal charges accumulated on the thermal imaging sensor 104 are transferred according to a driving signal (timing signal) supplied from a control circuit 105. The thermal imaging sensor 104 may be configured as one chip in a single body, or may be configured as a portion of a camera module packaged along with the optical system 102 and the signal processing circuit 106, and the like.

The thermal imaging sensor 104, like the imaging sensor 73 shown in FIG. 9, may be an imaging sensor in which the infrared detector 12 and the visible ray detector 71 are mixed.

In addition, in order to detect an absolute temperature, a temperature measuring element which detects a reference temperature $T_0$ of the infrared detector 12 in the reference value $I_D'$ may be further added to the thermal imaging sensor 104. In this case, the detected reference temperature $T_0$ is also measured in the signal processing circuit 106, and an absolute temperature of a measuring object is calculated in the signal processing circuit 106.

The control circuit 105 outputs a driving signal which controls a transfer operation of the thermal imaging sensor 104 and a shutter operation of the shutter device 103, and drives the thermal imaging sensor 104 and the shutter device 103.

The signal processing circuit 106 performs various types of signal processing for a pixel signal output from the thermal imaging sensor 104. An image (thermal image data) obtained by performing signal processing with the signal processing circuit 106 is supplied to the monitor 107 to be displayed, or supplied to the memory 108 to be stored (recorded).

Embodiments of the present disclosure are not limited to the embodiments described above, and various modifications are possible in a range without departing from the spirit of the present disclosure.

For example, it is possible to adopt a form of a combination of all or some of the plurality of embodiments described above.

Effects described in the present specification are no more than exemplifications, and there may be effects other than the effects described herein.

The present disclosure can also take the following configuration.

(1) An infrared detector that includes a source region and a drain region which are formed on a semiconductor substrate, an infrared ray absorbing film as a gate insulating film formed on the semiconductor substrate, and a gate electrode which is formed of a transparent electrode for infrared rays on the gate insulating film, in which, when a predetermined voltage is applied to the gate electrode, a predetermined current flows between the source region and the drain region.

(2) The infrared detector described in (1), in which a change in dielectric constant caused by a temperature rise due to absorption of infrared rays by the infrared ray absorbing film is detected as a gate capacity change.

(3) The infrared detector described in (2), in which the gate capacity change is detected as a drain current change.

(4) The infrared detector described in any one of (1) to (3), in which the gate electrode is formed using graphene.

(5) The infrared detector described in any one of (1) to (4), in which a temperature coefficient of dielectric constant of the infrared ray absorbing film is a positive value.

(6) The infrared detector described in any one of (1) to (5), in which the channel width and a channel length are lengths according to a wavelength of infrared rays to be detected.

(7) The infrared detector described in any one of (1) to (6), in which a plurality of infrared detectors are arranged in a two-dimensional array shape.

(8) The infrared detector described in (7), in which grooves are formed between adjacent infrared detectors.

(9) The infrared detector described in any one of (1) to (8), in which light passing through a cut filter which cuts at least visible rays disposed on a front surface of the infrared rays absorbing film is incident on the infrared ray absorbing film.

(10) A method of detecting infrared rays includes detecting, with an infrared detector, a change in a dielectric constant caused by a temperature rise due to absorption of infrared rays by the infrared ray absorbing film as a gate capacity change, in which the infrared detector includes a source region and a drain region formed on a semiconductor substrate, an infrared ray absorbing film as a gate insulating film formed on the semiconductor substrate, and a gate electrode formed of a transparent electrode with respect to infrared rays on the gate insulating film.

(11) An electronic apparatus includes an infrared detector which includes a source region and a drain region formed on a semiconductor substrate, an infrared ray absorbing film as a gate insulating film formed on the semiconductor substrate, and a gate electrode formed of a transparent electrode with respect to infrared rays on the gate insulating film, in which a predetermined current flows between the source region and the drain region when a predetermined voltage is applied to the gate electrode.

(12) The electronic apparatus described in (11), further includes a thermal imaging sensor in which a plurality of the infrared detectors are arranged.

(13) The electronic apparatus described in (11), further includes a thermal imaging sensor in which the infrared detector and a visible ray detector are mixed.

(14) The electronic apparatus described in any one of (11) to (13), further includes a cut filter which cuts at least visible rays, in which light passing through the cut filter is incident on the infrared detector.

(15) The electronic apparatus described in any one of (11) to (14), further includes a shutter which shields light incident on the infrared detector.

(16) The electronic apparatus described in any one of (11) to (15), further includes a reference temperature measuring unit which measures a reference temperature of the infrared detector, in which an absolute temperature of a measuring object is calculated by adding a temperature variation detected by the infrared detector to the measured reference temperature.

(17) The electronic apparatus described in (16), further includes a table which correlates a drain current variation detected by the infrared detector with the temperature variation detected by the infrared detector, in which an absolute temperature of a measuring object is calculated by adding the temperature variation calculated using the table to the measured reference temperature.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Shutter
2 IR lens
3 Cut filter
4 Thermal imaging sensor
11 Semiconductor substrate
12 Infrared detector
31 Drain region
32 Source region
33 Gate insulating film
34 Gate electrode
35 Channel
36 Grooves
71 Visible ray detector
72 Semiconductor substrate
73 Imaging sensor
101 Thermal imaging device
102 Optical system
103 Shutter device
104 Thermal imaging sensor
105 Control circuit
106 Signal processing circuit

What is claimed is:

1. An infrared detector comprising:
a source region and a drain region which are formed on a semiconductor substrate;
an infrared ray absorbing film as a gate insulating film formed on the semiconductor substrate; and
a gate electrode which is formed of a transparent electrode for infrared rays on the gate insulating film,
wherein, when a predetermined voltage is applied to the gate electrode, a predetermined current flows between the source region and the drain region.

2. The infrared detector according to claim 1,
wherein a change in dielectric constant caused by a temperature rise due to absorption of infrared rays by the infrared ray absorbing film is detected as a gate capacity change.

3. The infrared detector according to claim 2,
wherein the gate capacity change is detected as a drain current change.

4. The infrared detector according to claim 1,
wherein the gate electrode is formed using graphene.

5. The infrared detector according to claim 1,
wherein a temperature coefficient of the dielectric constant of the infrared ray absorbing film is a positive value.

6. The infrared detector according to claim 1,
wherein the channel width and the channel length are lengths according to the wavelength of infrared rays to be detected.

7. The infrared detector according to claim 1,
wherein a plurality of infrared detectors are arranged in a two-dimensional array shape.

8. The infrared detector according to claim 7,
wherein grooves are formed between adjacent infrared detectors.

9. The infrared detector according to claim 1,
wherein light passing through a cut filter which removes at least visible rays and is disposed on a front surface of the infrared ray absorbing film is incident on the infrared ray absorbing film.

10. A method of detecting infrared rays comprising:
detecting, with an infrared detector, a change in a dielectric constant caused by a temperature rise due to absorption of infrared rays by the infrared ray absorbing film as a gate capacity change,
wherein the infrared detector includes:
a source region and a drain region formed on a semiconductor substrate,
an infrared ray absorbing film as a gate insulating film formed on the semiconductor substrate, and
a gate electrode formed of a transparent electrode with respect to infrared rays on the gate insulating film.

11. An electronic apparatus comprising:
an infrared detector which includes a source region and a drain region formed on a semiconductor substrate, an infrared ray absorbing film as a gate insulating film formed on the semiconductor substrate, and a gate electrode formed of a transparent electrode with respect to infrared rays on the gate insulating film,
wherein a predetermined current flows between the source region and the drain region when a predetermined voltage is applied to the gate electrode.

12. The electronic apparatus according to claim 11, further comprising:
a thermal imaging sensor in which a plurality of the infrared detectors are arranged.

13. The electronic apparatus according to claim 11, further comprising:
a thermal imaging sensor in which the infrared detector and a visible ray detector are mixed.

14. The electronic apparatus according to claim 11, further comprising:
a cut filter which cuts at least visible rays,
wherein light passing through the cut filter is incident on the infrared detector.

15. The electronic apparatus according to claim 11, further comprising:
a shutter which shields light incident on the infrared detector.

16. The electronic apparatus according to claim 11, further comprising:
a reference temperature measuring unit which measures a reference temperature of the infrared detector,
wherein an absolute temperature of a measuring object is calculated by adding a temperature variation detected by the infrared detector to the measured reference temperature.

17. The electronic apparatus according to claim 16, further comprising:
a table which correlates a drain current variation detected by the infrared detector with the temperature variation detected by the infrared detector,
wherein an absolute temperature of a measuring object is calculated by adding the temperature variation calculated using the table to the measured reference temperature.

* * * * *